Figure 1:
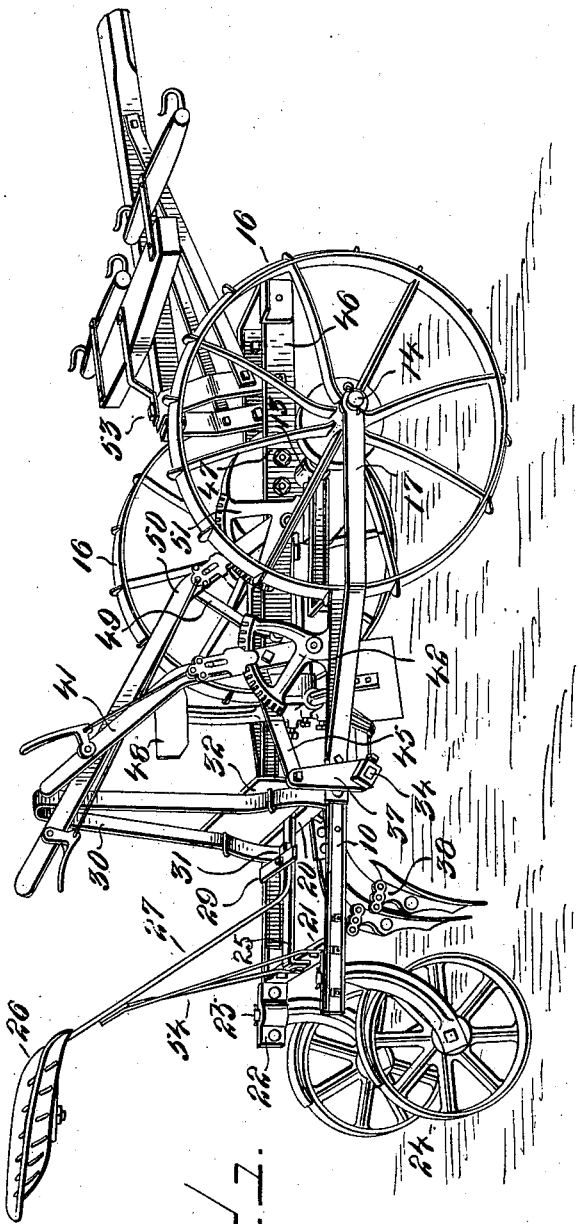

N. S. SODEKSON.
RIDING ATTACHMENT FOR COTTON CHOPPERS.
APPLICATION FILED DEC. 16, 1907.

903,336.

Patented Nov. 10, 1908.

2 SHEETS—SHEET 1.

Witnesses

Inventor.
Nathan S. Sodekson
By E. R. Stocking
Attorney

N. S. SODEKSON.
RIDING ATTACHMENT FOR COTTON CHOPPERS.
APPLICATION FILED DEC. 16, 1907.
903,336.
Patented Nov. 10, 1908.
2 SHEETS—SHEET 2.
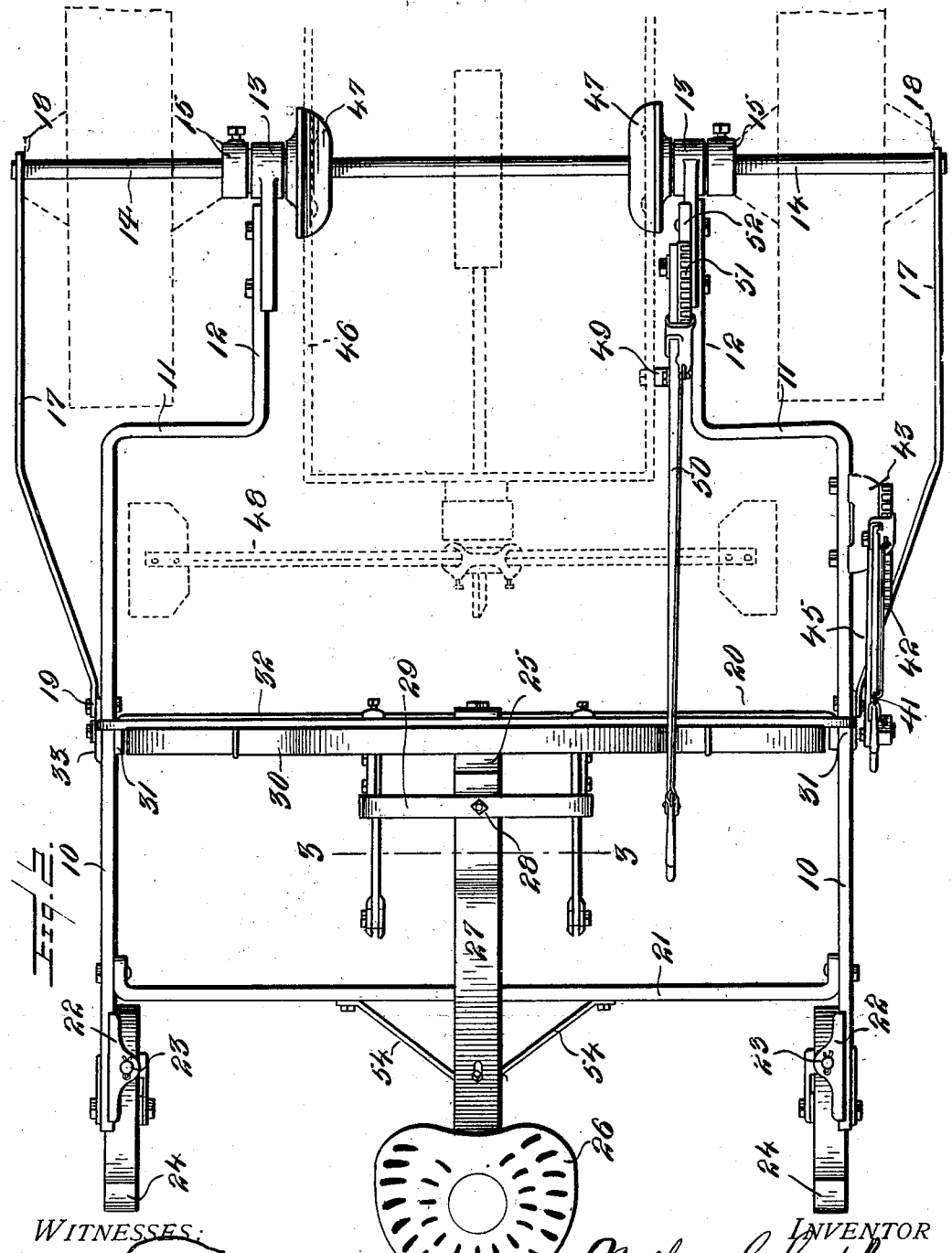

UNITED STATES PATENT OFFICE.

NATHAN S. SODEKSON, OF MINEOLA, TEXAS.

RIDING ATTACHMENT FOR COTTON-CHOPPERS.

No. 903,336.   Specification of Letters Patent.   Patented Nov. 10, 1908.

Application filed December 16, 1907. Serial No. 406,697.

*To all whom it may concern:*

Be it known that I, NATHAN S. SODEKSON, a citizen of the United States, residing at Mineola, county of Wood, and State of Texas, have invented certain new and useful Improvements in Riding Attachments for Cotton-Choppers, of which the following is a specification, reference being had therein to the accompanying drawing.

This invention relates to a riding attachment for cotton choppers, and particularly to a removable frame adapted for attachment to the axle of the chopper and extending to the rear of the hoes thereof.

The invention has for an object to provide a frame attachable to the axle of a cotton chopper and having means for a vertical adjustment of the chopper shaft and hoes so as to lift them from the ground when out of use and to hold them in any desired position for use.

Other and further objects and advantages of the invention will be fully set forth and the novel features thereof defined by the appended claims.

In the drawing:—Figure 1 is a perspective of the attachment applied to the cotton chopper. Fig. 2 is a top plan of the attachment with a portion of the chopper shown in dotted lines.

Like numerals refer to like parts in the several figures of the drawing.

The numeral 10 designates the frame of the attachment which is bent inward at 11 so that the parallel portions 12 thereof form a portion of less diameter than the body of the frame. To this portion 12 bearing boxes 13 are secured and adapted to fit upon the shaft 14 of any desired form of cotton chopper. This frame may be held against lateral movement by means of collars 15 secured to the shaft 14. Beyond this collar the usual wheel 16 (Fig. 1) of the chopper is applied. The brace strip 17 extends at its end 18 over the shaft 14, and is secured at its opposite end 19 to the frame. Intermediate of the ends of the frame 10 is a cross bar 20, and at the rear of the frame a similar bar 21 is provided, and adjacent to the bar 21 wheel bearings 22 are bolted to the ends of the frame. In these bearings the shafts 23 of the trailer wheels 24 are pivotally mounted and secured in any desired manner. These wheels may be of any desired size or construction best adapted for the use desired. Extending from the cross bar 20 to the bar 21 is a brace bar 25 upon which the seat 26 is carried by the standard 27 secured to the bar 25 by means of the bolt 28 or in any other desired manner. Also mounted upon this bar is the foot rest 29 extending to the opposite sides thereof.

At the front of the seat a guard frame 30, Fig. 1, is disposed and secured to the frame 15 at its opposite diverging ends 31. At the lower portion of this guard a fender board 32 is secured thereon to protect the rider from flying dirt from the hoes of the chopper.

The frame 10 is provided at opposite sides with bearings 33 embracing the angle irons of the frame and depending therefrom. These bearings support an angular rock shaft 34 provided with a crank arm 37, while the shaft intermediate of the sides of the frame is provided with a plurality of plows 38. This crank arm 37 is operated by means of the adjusting lever 41 pivotally mounted upon the sector 42, said sector having at its lower portion a bracket 43 bolted to the frame at one side thereof. From this lever a link 45 extends to the free end of the crank arm, as shown in Fig. 1.

The invention is adapted for application to any form of cotton chopper, but is herein shown in connection with the chopper illustrated and described in my Patent No. 874,129 dated December 17, 1907. In this form of chopper the frame 46 is mounted to rock on the shaft 14 by means of bearings 47 secured to the chopper and loosely mounted on said shaft. The chopper also carries the arms and hoes 48 at the rear thereof, and this portion of the chopper frame is connected with the riding attachment by means of the link 49 pivoted thereto at one end and to an adjusting lever 50 at its opposite end. This lever is mounted upon a sector 51 and has a latch coöperating therewith, while the sector is secured to the portion 12 of the frame by means of a bracket 52 bolted thereto. The chopper is provided with the usual shaft attachment 53, as shown in Fig. 1, and the seat 26 thereof may be braced against lateral play by means of the strips 54 extending in opposite directions from the seat standards 27 to the cross bar 21.

This attachment is adapted for application to the wheel shaft of any form of cotton chopper by simply removing from the frame the usual handles, and when so applied the elevation of the chopper blades or hoes is controlled from the frame by the connection therewith of the lever for that purpose. The attachment is provided with a seat for the driver, and a guard supported from the cross bar to prevent accidental contact with the revolving hoes, while the trailer wheels are freely pivoted to allow any desired movement of the latter and of the frame when connected to the chopper. This attachment is also provided with plows mounted upon the rock shaft carried thereby which are adjustable relative to each other for use in plowing out the cotton at the same time it is chopped, and the elevation of these plows may be controlled by the lever for that purpose mounted upon the frame of the attachment so that the plows may be used to sweep up the cotton after chopping. These plows may, however, be mounted upon the frame in any desired manner. The invention therefore presents a simple, efficient and economically constructed attachment readily applicable to the wheel shaft of a cotton chopper and adapted to be formed of metallic bars by which the maximum strength and rigidity may be secured with the minimum weight and size of the parts.

Having described my invention and set forth its merits, what I claim and desire to secure by Letters Patent is:—

1. In a cotton chopper the combination with a chopper frame having draft connections and an axle provided with a chopper mechanism and traction wheels, of an attachable frame independent of said chopper mechanism, carrier wheels mounted at the rear thereof, and bearing boxes carried at the front of said attachable frame to embrace said axle at opposite sides of the chopper mechanism.

2. In a cotton chopper the combination with a chopper frame having draft connections and an axle provided with a chopper mechanism and traction wheels, of an attachable frame independent of said chopper mechanism, carrier wheels mounted at the rear thereof, bearing boxes disposed at the front of said attachable frame to embrace said axle, cross bars connecting the side bars of said attachable frame, a longitudinal bar extending between said cross bars, and a seat supported from said longitudinal bar, at the rear of the chopper mechanism.

3. The combination with a cotton chopper comprising an axle having traction wheels thereon and a chopper frame pivoted upon said axle, of a rearwardly extending attachable frame independent of the chopper frame and provided with wheels and at its front with bearings to embrace said axle, a lever and sector supported by said attachable frame, and a connection from said lever to one end of the chopper frame at one side of the pivots thereof for adjustment of the chopper frame upon its axle.

4. The combination with a cotton chopper comprising an axle having traction wheels thereon and a chopper frame pivoted upon said axle, of a rearwardly extending attachment frame independent of the chopper frame and provided with wheels and at its front with bearings to embrace said axle, a lever and sector supported by said attachment frame, a connection from said lever to one end of the chopper frame at one side of the pivots thereof for adjustment of the chopper upon its axle, plows carried by said attachment frame, a lever and sector mounted upon said attachment frame for controlling said plows, and a connection from the last mentioned lever to said plows.

5. In a cotton chopper, the combination with a chopper frame having an axle provided with a chopper mechanism and traction wheels, of an independent attachment plow frame having its front portion of less width than its rear to embrace the chopper frame, shaft bearings secured to the front portion and mounted upon said wheel axle, bearing boxes secured to the rear of said attachment frame to provide bearings thereon, and carrier wheels mounted in said boxes.

In testimony whereof I affix my signature in presence of two witnesses.

NATHAN S. SODEKSON.

Witnesses:
A. D. BEAIRD,
J. E. PEEBLES.